(12) United States Patent
Griffin et al.

(10) Patent No.: US 11,997,201 B2
(45) Date of Patent: *May 28, 2024

(54) SYSTEMS AND METHODS FOR GENERATION OF THE LAST OBFUSCATED SECRET USING A SEED

(71) Applicant: Wells Fargo Bank, N.A., San Francisco, CA (US)

(72) Inventors: Phillip H Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,810

(22) Filed: Apr. 19, 2023

(65) Prior Publication Data

US 2023/0261861 A1 Aug. 17, 2023

Related U.S. Application Data

(63) Continuation of application No. 17/558,558, filed on Dec. 21, 2021, now Pat. No. 11,646,881, which is a
(Continued)

(51) Int. Cl.
*H04L 9/32* (2006.01)
*H04L 9/06* (2006.01)
*H04L 9/08* (2006.01)

(52) U.S. Cl.
CPC .......... *H04L 9/0869* (2013.01); *H04L 9/0643* (2013.01); *H04L 9/085* (2013.01); *H04L 9/32* (2013.01)

(58) Field of Classification Search
CPC ..... H04L 9/0869; H04L 9/0643; H04L 9/085; H04L 9/32
See application file for complete search history.

(56) References Cited

U.S. PATENT DOCUMENTS 9,722,779 B1 8/2017 Tomomura
9,768,953 B2 9/2017 Bernat et al.
(Continued)

FOREIGN PATENT DOCUMENTS

WO WO-00/49768 A1 8/2000

OTHER PUBLICATIONS

Chang et al., "A New Multi-stage Secret Sharing Scheme Using One-way Function", ACM SIGOPSS Operating Systems Review 39(1):48-55; Jan. 2005.
(Continued)

*Primary Examiner* — Stephen T Gundry
(74) *Attorney, Agent, or Firm* — Foley & Lardner LLP

(57) ABSTRACT

Systems and methods for securely sharing and authenticating a last secret can include generating, by a cryptographic module on a first network node, a seed configured for deriving or recovering a last secret, the last secret providing access to a secure entity and being a last cryptographic element controlling access to the secure entity, creating, by the cryptographic module, an envelope for the seed, enveloping the seed by the envelope, and transmitting, by the cryptographic module, the seed to a computing system on a second node different than the first node, the computing system being configured to decrypt the envelope of the enveloped seed to recover the seed, and obtain the last secret based on the seed, where the cryptographic module is prevented from deriving the last secret.

20 Claims, 3 Drawing Sheets

Related U.S. Application Data continuation of application No. 16/393,621, filed on Apr. 24, 2019, now Pat. No. 11,218,307.

(56) References Cited

U.S. PATENT DOCUMENTS

| | | | |
|---|---|---|---|
| 10,615,969 B1* | 4/2020 | Griffin | H04L 9/0877 |
| 10,615,970 B1* | 4/2020 | Griffin | H04L 9/0822 |
| 10,630,682 B1* | 4/2020 | Bhattacharyya | H04L 63/0869 |
| 10,742,420 B1* | 8/2020 | Griffin | H04L 9/3093 |
| 10,742,421 B1* | 8/2020 | Wentz | H04L 9/0897 |
| 10,826,708 B2 | 11/2020 | Campagna | |
| 10,958,424 B1 | 3/2021 | Chhabra | |
| 10,963,593 B1 | 3/2021 | Campagna et al. | |
| 11,153,074 B1 | 10/2021 | Nikitas et al. | |
| 11,184,157 B1 | 11/2021 | Gueron et al. | |
| 11,218,316 B2* | 1/2022 | Wentz | H04L 9/085 |
| 11,218,330 B2* | 1/2022 | Mondello | H04L 63/0823 |
| 11,251,959 B2* | 2/2022 | Wentz | H04L 9/3247 |
| 11,323,247 B2 | 5/2022 | Kuang | |
| 2002/0071566 A1 | 6/2002 | Kurn | |
| 2003/0037237 A1 | 2/2003 | Abgrall et al. | |
| 2015/0372813 A1 | 12/2015 | Brand | |
| 2017/0019385 A1 | 1/2017 | Yoo | |
| 2018/0102902 A1 | 4/2018 | Yang et al. | |
| 2018/0152305 A1 | 5/2018 | Jacquin et al. | |
| 2018/0159833 A1 | 6/2018 | Zhang et al. | |
| 2018/0248691 A1 | 8/2018 | Henderson et al. | |
| 2018/0248692 A1 | 8/2018 | Henderson et al. | |
| 2018/0367298 A1 | 12/2018 | Wright et al. | |
| 2019/0097794 A1 | 3/2019 | Nix | |
| 2019/0280863 A1 | 9/2019 | Meyer et al. | |
| 2020/0052905 A1* | 2/2020 | Mathias | H04L 9/0861 |
| 2020/0153627 A1* | 5/2020 | Wentz | G06F 21/6218 |
| 2020/0154272 A1 | 5/2020 | Uy et al. | |
| 2020/0186350 A1 | 6/2020 | Wentz et al. | |
| 2020/0201679 A1* | 6/2020 | Wentz | H04L 63/1433 |
| 2020/0235915 A1 | 7/2020 | Wright | |
| 2020/0252385 A1 | 8/2020 | Mullins et al. | |
| 2020/0252392 A1 | 8/2020 | Mullins et al. | |
| 2020/0259638 A1 | 8/2020 | Carmignani et al. | |
| 2020/0259651 A1 | 8/2020 | Mohassel et al. | |
| 2020/0313911 A1 | 10/2020 | Mondello et al. | |
| 2020/0328886 A1 | 10/2020 | Newton et al. | |
| 2020/0374100 A1 | 11/2020 | Georgieva et al. | |
| 2021/0051006 A1 | 2/2021 | Carlson | |
| 2021/0091952 A1 | 3/2021 | Wentz | |
| 2021/0111875 A1 | 4/2021 | Le Saint | |
| 2022/0158855 A1 | 5/2022 | Wentz | |

OTHER PUBLICATIONS

Harn & Wang, "Threshold Signature Scheme without Using Polynomial Interpolation," International Journal of Network Security 18(4), pp. 710-717 (2016).

Harn, et al., "How to Share Secret Efficiently over Networks," Security and Communication Networks 2017, 5437403, 6 pages (2017).

Housley Cryptographic Message Syntax (CMS) Request for Comments: 5652, Sep. 2009, Network Working Group, p. 1-56 (Year: 2009).

* cited by examiner

SYSTEMS AND METHODS FOR GENERATION OF THE LAST OBFUSCATED SECRET USING A SEED

CROSS-REFERENCE TO RELATED PATENT APPLICATIONS

This application is a continuation of U.S. patent application Ser. No. 17/558,558, filed Dec. 21, 2021, titled "SYSTEMS AND METHODS FOR GENERATION OF THE LAST OBFUSCATED SECRET USING A SEED," which is a continuation of U.S. patent application Ser. No. 16/393,621, filed Apr. 24, 2019, titled "SYSTEMS AND METHODS FOR GENERATION OF THE LAST OBFUSCATED SECRET USING A SEED," the content of all such applications is incorporated herein by reference in its entirety and for all purposes.

TECHNICAL FIELD

The present application relates generally to systems and methods for securely storing passwords and/or encryption keys.

BACKGROUND

Access to electronic entities such as servers, databases, applications, etc. can be controlled using a cryptographic process. The cryptographic process can be initiated using a cryptographic key. The cryptographic key may be password-protected to prevent initialization of the cryptographic process without authorization. The password is considered a "last secret," because the password is the final element needed to recover the cryptographic key. However, the cryptographic key and the password conventionally are saved to a non-volatile medium such that the cryptographic key and the password can survive an application or system restart. Often, the components, shares, etc. of the cryptographic key are stored on media such as paper, smart cards, or USB sticks that are provided to human operators. Conventionally, the human operators provide the components, shares, etc. to regenerate the cryptographic key. The human operators may need to provide their component, share, etc. to regenerate the cryptographic key simultaneously, which can be inconvenient. Furthermore, if the paper, smart cards, or USB sticks are stolen by an unauthorized party, the unauthorized party can regenerate the cryptographic key.

SUMMARY

One arrangement relates to a method for securely sharing and authenticating a last secret. The method can include generating, by a cryptographic module on a first network node, a seed configured for deriving or recovering a last secret, the last secret providing access to a secure entity and being a last cryptographic element controlling access to the secure entity, creating, by the cryptographic module, an envelope for the seed, enveloping the seed by the envelope, and transmitting, by the cryptographic module, the seed to a computing system on a second node different than the first node, the computing system being configured to decrypt the envelope of the enveloped seed to recover the seed, and obtain the last secret based on the seed, where the cryptographic module is prevented from deriving the last secret.

One arrangement relates to a system for securely sharing and authenticating a last secret. The system can include a cryptographic module on a first network node, the cryptographic module including a first processor and a first memory, the first processor including a seed generation circuit configured to generate a seed configured to obtain a last secret, the last secret providing access to a secure entity and being a last cryptographic element controlling access to the secure entity, create an envelope for the seed, envelop the seed by the envelope, and transmit the enveloped seed to a computing system on a second node different than the first node, the computing system being configured to decrypt the envelope of the enveloped seed to recover the seed, and obtain the last secret based on the seed, where the cryptographic module is prevented from deriving the last secret.

One arrangement relates to a non-transitory computer-readable medium for securely sharing and authenticating a last secret storing computer-readable instructions such that, when executed, can cause a processor to generate, by the processor on a first network node, a seed configured to obtain a last secret, the last secret providing access to a secure entity and being a last cryptographic element controlling access to the secure entity, create, by the processor, an envelope for the seed, envelop, by the processor, the seed by the envelope, and transmit, by the processor, the enveloped seed to a computing system on a second node different than the first node, the computing system being configured to decrypt the envelope of the enveloped seed to recover the seed, and obtain the last secret based on the seed, where the cryptographic module is prevented from deriving the last secret.

DETAILED DESCRIPTION

Figure 1:
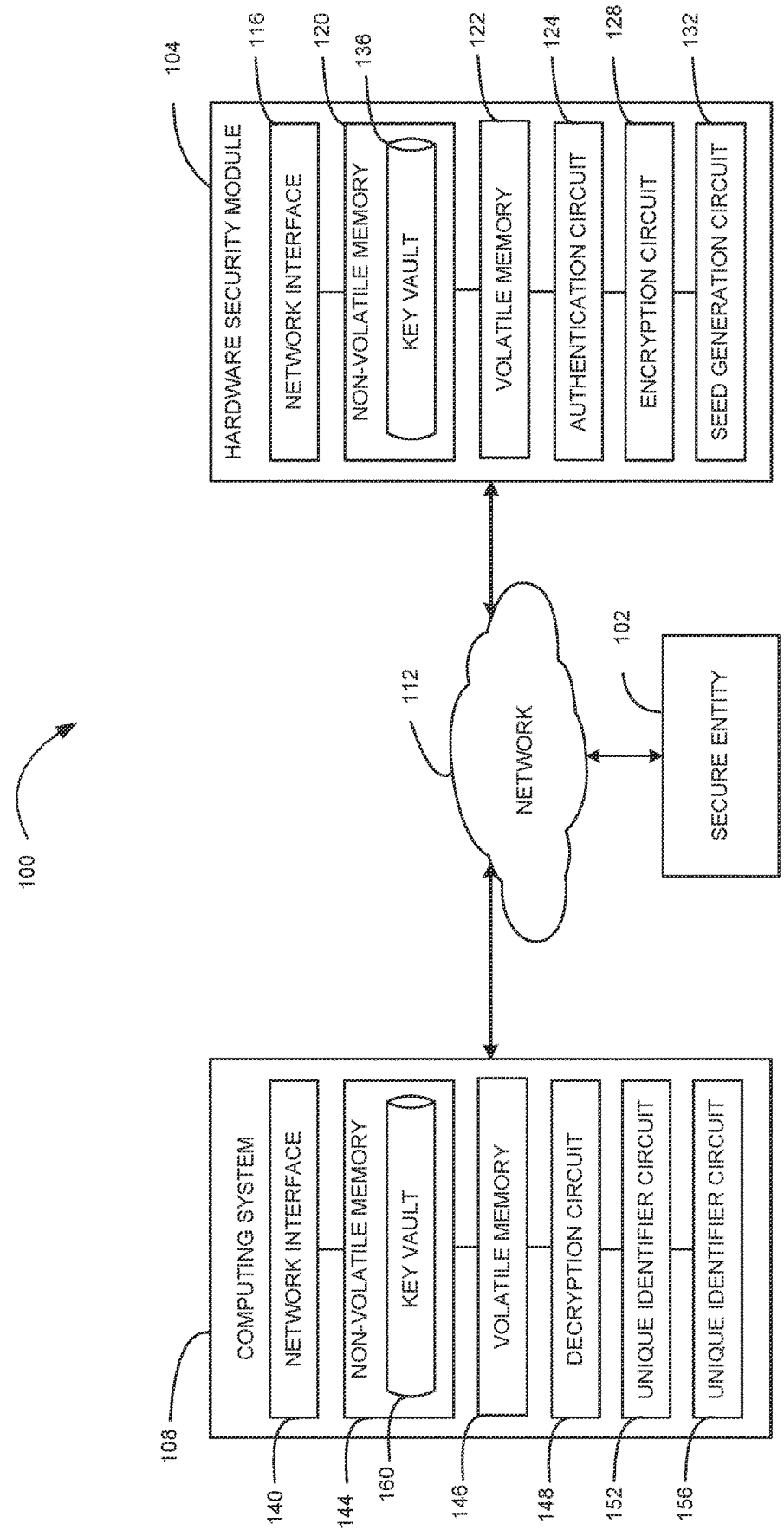
FIG. 1 is a diagram of a system for generating a last secret using a seed and maintaining confidentiality, integrity, and authenticity of the last secret, according to one arrangement.

Referring to the figures generally, various systems, methods, and apparatuses for maintaining the integrity, authenticity, and confidentiality of a last secret are described herein. The phrase "last secret" as used herein refers to the last cryptographic element that controls access to one or more of an encryption key, a biometric, one or more pieces of encrypted data, a password used to generate a key, a password used to access a secure entity such as data and/or a secure computing device, and any other information intended to be stored securely as cryptographic material. "Last" means that after the last secret is accessed, the key can be accessed without using further cryptographic elements. The last secret can be a password, an encryption key, or a detokenization request that is provided by an entity to gain access to initialization information to start up a cryptographic process for communicating with a secure computing system or to access the biometric, the one or more pieces of encrypted data, etc. In some arrangements, a system for securely sharing and authenticating a last secret includes cryptographic module and a computing system that are in communication over a network. In some arrangements, the cryptographic module is a hardware security module (HSM). The cryptographic module and the computing system are on separate network nodes. Together, the cryptographic module and the computing system exchange data to derive or recover the last secret.

The cryptographic module includes an authentication circuit, an encryption circuit, and a seed generation circuit. The authentication circuit is configured to authenticate the computing system. The encryption circuit is configured to generate a master key (MK) and a hash-based message authentication code (HMAC) key (HK). The encryption circuit is configured to encrypt the HK with the MK to generate a cryptogram MK(HK). The encryption circuit is configured to securely send the cryptogram MK(HK) to the computing system. The encryption circuit is configured to save the MK to a key vault of a non-volatile memory of the cryptographic module. As used herein, the term "non-volatile memory" refers to long-term persistent storage implemented, for example, on permanent computer storage media, that maintains its data even when the device is powered off. Exemplary forms of non-volatile memory include read-only memory, flash memory, ferroelectric random access memory, magnetic computer storage, optical disks, cache memory, or any other non-volatile media. The encryption circuit is configured to destroy the HK after sending the cryptogram MK(HK) to the computing system.

The seed generation circuit is configured to receive the cryptogram MK(HK) and a unique identifier (ID) from the computing system. The seed generation circuit is configured to decrypt the cryptogram MK(HK) using the MK to recover the HK. The seed generation circuit is configured to generate a seed based on the HK and the ID. Generating the seed based on both the HK and the ID maintains the integrity of the last secret because a HK or an ID that has been altered or replaced by a malicious party cannot be recombined into the seed. The seed generation circuit is configured to create a cryptographic message syntax (CMS) envelope around the seed. In some arrangements, the CMS envelope can include attributes related to the seed. Such attributes can include a location attribute that specifies where (e.g., a geographic location, a recipient, a data center, a server identifier, an application database, a software instance, a firmware version, etc.) the seed can be sent or used, a validity period of the seed, a security assertion markup language (SAML) assertion, and/or a microcode. The seed generation circuit is configured to send the seed to the computing system. The seed generation circuit is then configured to destroy the seed. The cryptogram MK(HK), the ID, and the seed are only present in the volatile memory of the cryptographic module. The non-volatile memory excludes the cryptogram MK(HK), the ID, and the seed. As used herein, "excludes" means does not store (e.g. write) to the memory, cache memory, or any other non-volatile media.

The computing system includes a decryption circuit, a unique identifier generation circuit, and a last secret circuit. The decryption circuit is configured to receive the cryptogram MK(HK) from the cryptographic module. The unique identifier generation circuit is configured to generate an ID for the cryptogram MK(HK). The unique identifier generation circuit is configured to save the cryptogram MK(HK) and the ID to the memory of the computing system. In response to determining a need for the last secret, the last secret circuit is configured to identify the cryptogram MK(HK) and the ID corresponding to the last secret from the key vault and read the cryptogram MK(HK) and the ID corresponding to the last secret into the volatile memory. The last secret circuit is configured to transmit the cryptogram MK(HK) and the ID to the cryptographic module. The last secret circuit is configured to receive the seed from the cryptographic module as CMS EnvelopedData. In some arrangements, the CMS envelope includes attributes related to the seed. In such arrangements, the last secret circuit is configured to read the attributes of the seed from the CMS envelope. The attributes can include a location attribute that specifies where the seed can be sent or used, a validity period of the seed, a SAML assertion, and/or a microcode. After authenticating the seed and/or verifying the attributes of the seed, the last secret circuit is configured to use the seed as an input to a pseudo random function (PRF) to derive or recover the last secret. The last secret only exists in the volatile memory of the computing system. The non-volatile memory excludes the last secret and the seed.

Referring now to FIG. 1, a diagram of a system 100 for generating a last secret that can be sent and stored confidentially and authenticated is shown, according to an example arrangement. The last secret can be a password, an encryption key, or a tokenized value that is provided by an entity to gain access to initialization information to start up a cryptographic process for communicating with a secure entity 102. The secure entity 102 is a secure computing system, a secure database, and/or encrypted data. In the arrangement of FIG. 1, the seed is a hashed message authentication code (HMAC) seed that is derived using an HMAC according to a cryptographic message syntax (CMS) method. An example CMS method is a database encryption key management (DBEKM) scheme as defined in ANSI Standard X9.73 that is used to derive the last secret based on a seed. An example of the DBEKM scheme is described in U.S. patent application Ser. No. 16/203,191, titled "SYSTEMS AND METHODS FOR MAINTAINING CONFIDENTIALITY, INTEGRITY, AND AUTHENTICITY OF THE LAST SECRET," filed on Nov. 28, 2018, which is hereby incorporated by reference in its entirety. As shown, the system 100 includes the secure entity 102, a cryptographic module 104 and a computing system 108 connected by a network 112. In the illustrated arrangement, the cryptographic module 104 is a hardware security module (HSM). As shown in FIG. 1, the secure entity 102, the cryptographic module 104, and the computing system 108 are on different network nodes. In some arrangements, the secure entity 102 is located on the same network node as the computing system 108.

The cryptographic module 104 includes a network interface 116, a non-volatile memory 120, a volatile memory 122, an authentication circuit 124, an encryption circuit 128, and a seed generation circuit 132. The network interface 116 is configured to establish a communication session via the network 112 with the other components of the system 100. As shown in FIG. 1, the non-volatile memory 120 is communicably and operatively coupled with the other components of the cryptographic module 104. The non-volatile memory 120 includes a key vault 136 that includes a signing key. As used herein, the term "non-volatile memory" refers to long-term persistent storage implemented, for example, on permanent computer storage media, that maintains its data even when the device is powered off. Exemplary forms of non-volatile memory include read-only memory, flash memory, EEPROM, SSD, NAND, ferroelectric RAM, magnetic computer storage, optical disks, cache memory, or any other non-volatile media. As used herein, the term "volatile memory" refers to computer storage that maintains its data only while the device (e.g., the cryptographic module 104 and/or the computing system 108) is powered. Exemplary forms of volatile memory include RAM, DRAM, SRAM, and other volatile media. As used herein, the term "signing key" refers to an encryption key or keys used to generate a signature. In some arrangements, the signing key can be a private key of an asymmetric key pair of the system that creates the signature (e.g., the cryptographic module 104, the computing system 108). In some arrangements, the signing key can be a symmetric key. As used herein, the term "signature" refers to a digital signature, a hash signature, a time stamp token, a message authentication code (MAC), and/or a hashed message authentication code (HMAC). The signature can be used to authenticate data elements and/or messages sent from the system that creates the signature to a recipient. In arrangements in which the signing key is a private key of the system that creates the signature (e.g., the cryptographic module 104, the computing system 108), the signature is based on the private (e.g., never shared) key of the system that creates the signature. In arrangements in which the signature is a MAC or an HMAC, the signing key is a symmetric key that is unique to the system that creates the signature and a specific recipient. In some arrangements, when the cryptographic module 104 is the system that creates the signature, the specific recipient is the computing system 108. When the computing system 108 is the system that creates the signature, the specific recipient is the cryptographic module 104.

The authentication circuit 124 is configured to validate the computing system 108. In some arrangements, the authentication circuit 124 is configured to validate the computing system 108 each time that the computing system 108 sends a message to the cryptographic module 104 and/or each time that the computing system 108 and the cryptographic module 104 establish a secure connection, such as a TLS connection. In some arrangements, the authentication circuit 124 is configured to authenticate the computing system 108 based on a signature of the computing system 108. In some arrangements, the authentication circuit 124 is configured to authenticate the computing system 108 using other methods, such as by verifying a MAC appended to messages sent by the computing system 108. In arrangements in which the computing system 108 is configured to send CMS EnvelopedData as defined in ANSI X9.73 or Recommendation ITU-T X.894, both of which are incorporated by reference herein in their entirety, to the cryptographic module 104, the cryptographic module 104 can be configured to authenticate the computing system 108 based on a SAML assertion included as an attribute of the CMS EnvelopedData.

The encryption circuit 128 is configured to generate a master key (MK) and a HMAC key (HK). The encryption circuit 128 is configured to encrypt the HK with the MK to generate a cryptogram MK(HK). In some arrangements, the cryptographic module 104 may sign the cryptogram MK(HK) with the signing key. The encryption circuit 128 is configured to securely send the cryptogram MK(HK) to the computing system 108. In some arrangements, the encryption circuit 128 is configured to send the cryptogram MK(HK) to the computing system 108 over a secure connection such as a TLS connection. In some arrangements, the encryption circuit 128 is configured to create a CMS envelope around the cryptogram MK(HK). In some arrangements, the CMS envelope includes attributes related to the cryptogram MK(HK). Such attributes can include a location attribute that specifies where (e.g., a geographic location, a recipient, a data center, a server identifier, an application database, a software instance, a firmware version, etc.) the cryptogram MK(HK) can be sent or used, a validity period of the cryptogram MK(HK), a SAML assertion, information indicative of an identity of one or more entities that can read the cryptogram MK(HK) from the key vault 136, and/or a microcode. In some arrangements, the information indicative of the one or more entities that can read the cryptogram MK(HK) include a key identifier and/or a certificate. As used herein, the validity period can include an expiration date or a predefined time period for which the cryptogram MK(HK) is valid. In some arrangements, the microcode is configured to execute each time the cryptogram MK(HK) is read from the key vault 136 and transmit a notification to an administrator of the cryptographic module 104, an administrator of the computing system 108, and/or an administrator or owner of the secure entity 102 indicating that the cryptogram MK(HK) has been accessed. The encryption circuit 128 is configured to save the MK to the key vault 136 of the non-volatile memory 120. The encryption circuit 128 is configured to destroy the HK after sending the cryptogram MK(HK) to the computing system 108.

The seed generation circuit 132 is configured to receive the cryptogram MK(HK) and the ID from the computing system 108. In some arrangements, the seed generation circuit 132 receives the cryptogram MK(HK) and a unique identifier (ID) of the cryptogram MK(HK) over the secure connection. In some arrangements, the seed generation circuit 132 receives the cryptogram MK(HK) and the ID as CMS EnvelopedData. In arrangements in which the cryptogram MK(HK) is signed by the cryptographic module 104, the seed generation circuit 132 is configured to verify the signature of the cryptogram MK(HK) using the signing key of the cryptographic module 104. In arrangements in which the cryptogram MK(HK) and/or the ID are signed by the computing system 108, the seed generation circuit 132 is configured to verify the signature of the cryptogram MK(HK) and/or the ID using the public key of the computing system 108. In arrangements in which the seed generation circuit 132 receives the cryptogram MK(HK) and ID as CMS EnvelopedData, the seed generation circuit 132 is configured to read the attributes from the CMS envelope. In arrangements in which the attribute includes a validity period, the seed generation circuit 132 is configured to verify that the validity period has not expired before decrypting the cryptogram MK(HK).

The seed generation circuit 132 is configured to decrypt the cryptogram MK(HK) using the MK to recover HK. The seed generation circuit 132 is then configured to generate a seed based on the HK and the ID. The seed is a hashed message authentication code (HMAC) seed that is derived using an HMAC according to a cryptographic message syntax (CMS) method. Generating the seed based on both the HK and the ID maintains the integrity of the last secret because an HK or an ID that has been altered or replaced by a malicious party cannot be recombined into the seed. In some arrangements, the seed generation circuit 132 is configured to sign the seed with the signing key of the cryptographic module 104. The signature of the seed can be used by the computing system 108 to authenticate the seed. The seed generation circuit 132 is configured to create a CMS envelope around the seed. In some arrangements, the CMS envelope includes attributes related to the seed. Such attributes can include a location attribute that specifies where (e.g., a geographic location, a recipient, a data center, a server identifier, an application database, a software instance, a firmware version, etc.) the seed can be sent or used, a validity period of the seed, a SAML assertion, and/or a microcode. In some arrangements, the microcode is configured to execute each time the seed is read into the volatile memory 146 of the computing system 108 and transmit a notification to an administrator of the computing system 108, and/or an administrator or owner of the secure entity 102 indicating that the seed has been accessed. In some arrangements, the seed generation circuit 132 is configured to send the seed to the computing system 108 over the secure connection. The seed generation circuit 132 is then configured to destroy the seed. The cryptogram MK(HK), the ID, and the seed are only present (e.g., stored) in the volatile memory 122 of the cryptographic module 104. The non-volatile memory 120 excludes the cryptogram MK(HK), the ID, and the seed. As used herein, "excludes" means does not store, e.g., "the non-volatile memory 120 excludes the cryptogram MK(HK), the ID, and the seed" means that the non-volatile memory 120, cache memory, or any other non-volatile media does not store (e.g. write) the cryptogram MK(HK), the ID, or the seed. As is described in greater detail below, the cryptographic module 104 does not include (e.g., excludes) the pseudo random function (PRF) that is used to derive the last secret from the seed. Therefore, if an unauthorized party gains access to the cryptographic module 104, the unauthorized party cannot obtain the last secret because the cryptogram MK(HK), the ID, and the seed are never saved to the non-volatile memory 120 and the cryptographic module 104 does not include the (PRF) that is used to derive the last secret based on the seed.

The computing system 108 can be a database server, an application server, a file server, a mail server, a print server, a web server, and/or a game server that is in communication with other serving computing systems and/or client devices connected to the network 112. The secure computing system 108 includes a non-volatile memory 144, a volatile memory 146, a network interface 140, a decryption circuit 148, a unique identifier generation circuit 152, and a last secret circuit 156. The network interface 140 of the secure computing system 108 is adapted for and configured to establish a communication session via the network 112 with the other components of the system 100. As shown in FIG. 1, the non-volatile memory 144 is communicably and operatively coupled with the other components of the secure computing system 108. The non-volatile memory 144 includes a key vault 160. The key vault 160 is configured to retrievably store information related to the public/private key pair and the signing key of the secure computing system 108.

The decryption circuit 148 is configured to receive the cryptogram MK(HK) from the cryptographic module 104. In some arrangements, the decryption circuit 148 receives the cryptogram MK(HK) over a secure connection. In some arrangements, the decryption circuit 148 receives the cryptogram MK(HK) as CMS EnvelopedData. In arrangements in which the cryptogram MK(HK) is signed, the decryption circuit 148 is configured to verify the signature of the cryptogram MK(HK) using the public key of the cryptographic module 104. In arrangements in which the decryption circuit 148 receives the cryptogram MK(HK) as CMS EnvelopedData, the decryption circuit 148 is configured to read the attributes of the cryptogram MK(HK) from the CMS envelope. In arrangements in which the attributes include a validity period for the cryptogram MK(HK), the decryption circuit 148 is configured to verify that the validity date and/or time has not passed. The decryption circuit 148 is configured to decrypt the CMS envelope and read the cryptogram MK(HK) into the volatile memory 146.

The unique identifier generation circuit 152 is configured to generate the ID for the cryptogram MK(HK). The unique identifier generation circuit 152 is configured to save the cryptogram MK(HK) and the ID to the non-volatile memory 144 of the computing system 108. In some arrangements, the unique identifier generation circuit 152 is configured to cryptographically sign the ID with the signing key.

The last secret circuit 156 is configured to determine a need for a last secret. The first time that the last secret is requested, the last secret circuit 156 may determine a need to use the last secret to encrypt initialization information to start up a cryptographic process for communicating with a secure computing system, accessing a secure database, and/or accessing encrypted data. At a later time, the last secret circuit 156 may determine that a last secret is required to gain access to initialization information to start up a cryptographic process for communicating with a secure computing system, accessing a secure database, and/or accessing encrypted data. In another example, the last secret circuit 156 may determine that the last secret is required after starting or restarting and/or after a connection to a secure computing system or secure database that the computing system 108 has accessed using the last secret has disconnected.

In response to determining a need for the last secret, the last secret circuit 156 is configured to identify the cryptogram MK(HK) and the ID corresponding to the last secret from the key vault 160 and read the cryptogram MK(HK) and the ID corresponding to the last secret into the volatile memory 146. In some arrangements, the last secret circuit 156 is configured to generate a signature for the cryptogram MK(HK) and/or the ID. The last secret circuit 156 is configured to transmit the cryptogram MK(HK) and the ID to the cryptographic module 104. In some arrangements, the last secret circuit 156 is configured to transmit the cryptogram MK(HK) and the ID to the cryptographic module 104 over a secure connection. In some arrangements, the last secret circuit 156 is configured to create a CMS envelope around the cryptogram MK(HK) and the ID. In some arrangements, the CMS envelope can include attributes related to the cryptogram MK(HK) and/or the ID. Such attributes can include a location attribute that specifies where (e.g., a geographic location, a recipient, etc.) the cryptogram MK(HK) can be sent, a validity period of the cryptogram MK(HK), and/or a SAML assertion.

The last secret circuit 156 is configured to receive the seed from the cryptographic module 104 as CMS EnvelopedData. In some arrangements, the last secret circuit 156 receives the seed over a secure connection. In some arrangements, the CMS envelope includes attributes related to the seed. In such arrangements, the last secret circuit 156 is configured to read the attributes of the seed from the CMS envelope. The attributes can include a location attribute that specifies where the seed can be sent or used, a validity period of the seed, a SAML assertion, and/or a microcode. In arrangements in which the attribute includes a validity period for the seed, the last secret circuit 156 is configured to verify that the validity date and/or time has not passed. In arrangements in which the attributes include the microcode, the microcode is configured to execute each time the seed is read into the volatile memory 146 of the computing system 108 and transmit a notification to an administrator of the computing system 108, and/or an administrator or owner of the secure computing system, secure database, and/or secure data protected by the last secret indicating that the seed has been accessed. In arrangements in which the seed is signed, the last secret circuit 156 is configured to authenticate the signed seed by verifying the signature of the seed using the public key of the cryptographic module 104.

After authenticating the seed and/or verifying the attributes of the seed, the last secret circuit 156 is configured to use the seed as an input to a pseudo random function (PRF) to derive or recover the last secret. In some arrangements, the PRF is a SHA-256 algorithm. In other arrangements, the PRF can be another type of hash algorithm. When the last secret is first derived, the last secret circuit 156 is configured to use the last secret to encrypt initialization information to start up a cryptographic process for communicating with a secure computing system, access a secure database, and/or access encrypted data. When the last secret is recovered, the last secret circuit 156 is configured to use the last secret to decrypt the initialization information to start up a cryptographic process for communicating with a secure computing system, access a secure database, and/or access encrypted data. The last secret only exists in the volatile memory 146 of the computing system 108. The non-volatile memory 144 excludes the last secret and the seed. As used herein, "excludes" means does not store (e.g. write) to the non-volatile memory 144, cache memory, or any other non-volatile media.

The cryptographic module 104 cannot access the PRF and does not know the PRF. Therefore, the cryptographic module 104 cannot regenerate the last secret. The computing system 108 cannot generate the seed. The computing system 108 uses the seed which has been externally provided by the cryptographic module 104. As used herein, "externally provided" means provided by an entity (e.g. the cryptographic module) on a different network node. Therefore, the computing system 108 cannot generate the last secret without receiving the seed from the cryptographic module 104. Therefore, if an unauthorized party gains access to either the cryptographic module 104 or the computing system 108, the unauthorized party cannot regenerate the last secret because the cryptographic module 104 does not include the PRF and the computing system 108 cannot generate the seed.

Figure 2:
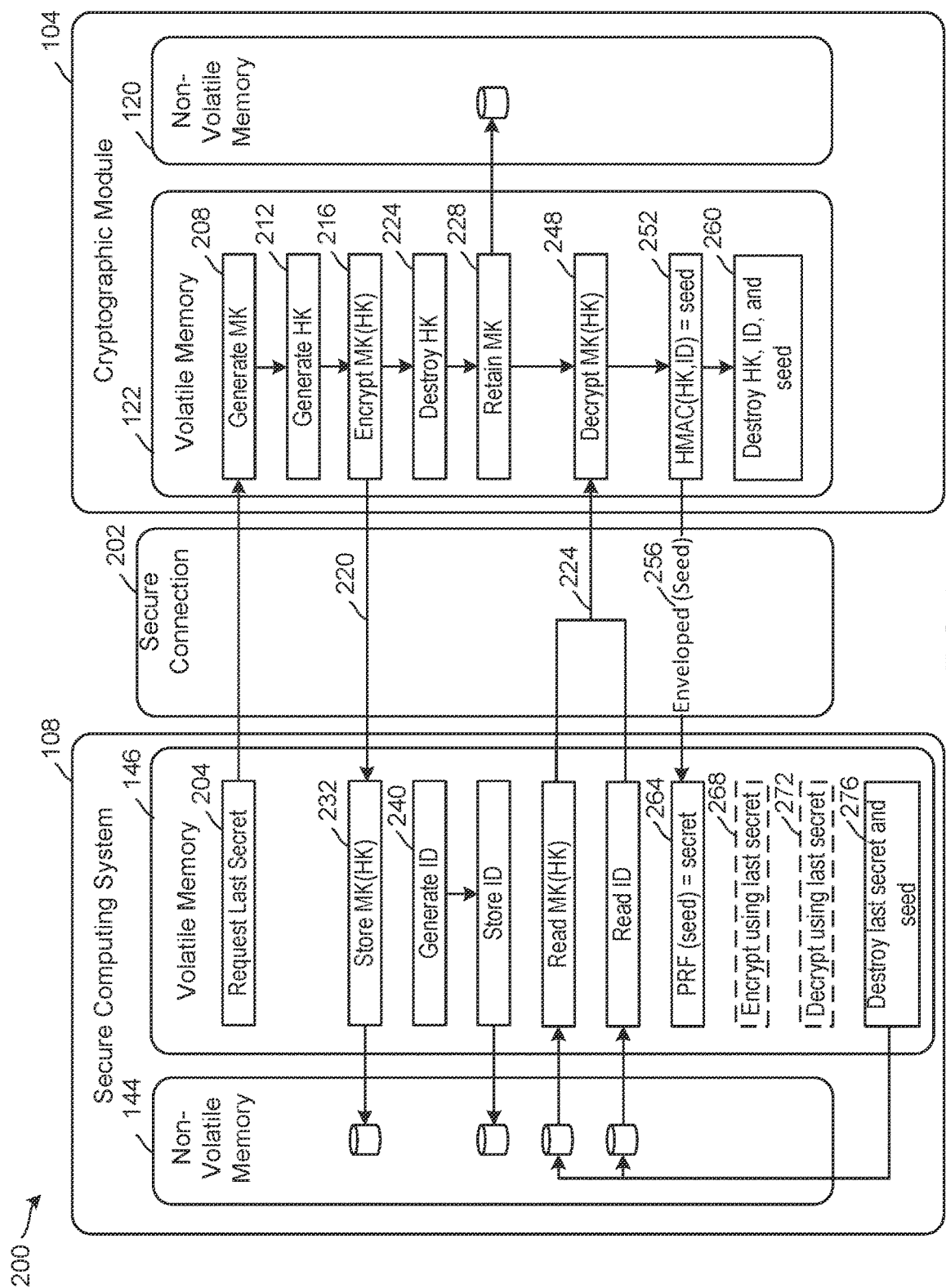
FIG. 2 is a flow diagram showing a process of generating the last secret using the seed while maintaining confidentiality, integrity, and authenticity of the last secret, according to one arrangement.

Referring now to FIG. 2, a flow diagram of a method 200 for initiating a cryptographic process is shown, according to an example arrangement. The method 200 maintains confidentiality, integrity, and authenticity of initialization information for the cryptographic process. Referring to FIGS. 1-2, blocks 204-268 describe a process (executed by the cryptographic module 104 and the computing system 108) for deriving and using a new last secret. Blocks 204, 244-262 and block 272 describe a process (executed by the cryptographic module 104 and the computing system 108) for recovering a previously derived last secret and using the recovered last secret. The computing system 108 determines a need to derive a last secret to control access to one or more of an encryption key, a biometric, one or more pieces of encrypted data, a password used to generate a key, a password used to gain access to the secure entity 102, and other cryptographic material. The computing system 108 requests a seed configured for deriving or recovering the last secret from the cryptographic module 104, at block 204. For example, the computing system 108 requests the seed by transmitting a seed request over a secure connection 202 to the cryptographic module 104. In some arrangements, the secure connection is a TLS connection. At block 208, the encryption circuit 128 of the cryptographic module 104 generates the MK. At block 212, the encryption circuit 128 generates the HK. At block 216, the encryption circuit 128 encrypts the HK with the MK to generate the cryptogram MK(HK). In some arrangements, the encryption circuit 128 signs the cryptogram MK(HK) with the signing key of the cryptographic module 104. In some arrangements, the encryption circuit 128 generates a CMS envelope for the cryptogram MK(HK). In such an arrangement, the encryption circuit 128 may generate attributes for the cryptogram MK(HK) and add the attributes to the CMS envelope. At block 220, the cryptographic module 104 securely sends the cryptogram MK(HK) to the computing system 108 over the secure connection 202. At block 224, the encryption circuit 128 destroys the HK. At block 228, the encryption circuit 128 saves the MK to the key vault 136 of the non-volatile memory 120 of the cryptographic module 104.

The computing system 108 receives the cryptogram MK(HK) from the cryptographic module 104 over the secure connection 202. In arrangements in which the cryptogram MK(HK) is signed, the decryption circuit 148 of the computing system 108 is configured to verify the signature of the cryptogram MK(HK) using the public key of the cryptographic module 104. In arrangements in which the cryptogram MK(HK) is CMS EnvelopedData, the decryption circuit 148 decrypts the CMS envelope to access the cryptogram MK(HK). In arrangements in which the CMS EnvelopedData includes attributes, the decryption circuit 148 reads the attributes from the CMS envelope. The decryption circuit 148 verifies the attributes. For example, in arrangements in which the attribute is a location, the decryption circuit 148 confirms that the location (e.g., of the computing system 108) complies with the location attribute. In arrangements in which the attribute is a validity period, the decryption circuit 148 confirms that the validity period has not expired. At block 232, the decryption circuit 148 saves the cryptogram MK(HK) to the key vault 160 in the non-volatile memory 144 of the computing system 108.

At block 236, the unique identifier generation circuit 152 generates a unique ID for the cryptogram MK(HK). At block 240, the unique identifier generation circuit 152 saves the ID to the key vault 160 of the non-volatile memory 144 of the computing system 108.

At block 244, the last secret circuit 156 of the computing system 108 reads the cryptogram MK(HK) and the ID into the volatile memory 146 and sends the cryptogram MK(HK) and the ID to the cryptographic module 104 over the secure connection 202. In some arrangements, the last secret circuit 156 signs the cryptogram MK(HK) and/or the ID with the signing key of the computing system 108. In some arrangements, the last secret circuit 156 creates a CMS envelope for the cryptogram MK(HK) and the ID.

The cryptographic module 104 receives the cryptogram MK(HK) and the ID from the computing system 108 over the secure connection 202. In arrangements in which the cryptogram MK(HK) and/or the seed are digitally signed, the seed generation circuit 132 of the cryptographic module 104 verifies the signature(s) of the cryptogram MK(HK) and/or the ID. At block 248, the seed generation circuit 132 decrypts the cryptogram MK(HK) with the MK to recover the HK. At block 252, the seed generation circuit 132 of the cryptographic module 104 generates the seed based on the HK and the ID. In some arrangements, the seed generation circuit 132 signs the seed using the signing key of the cryptographic module 104. The seed generation circuit 132 creates a CMS envelope for the seed. In some arrangements, the seed generation circuit 132 generates attributes for the seed and adds the attributes to the CMS envelope. The attributes can include a location attribute that specifies where the seed can be sent or used, a validity period of the seed, a SAML assertion, and/or a microcode. In arrangements in which the attribute includes a validity period for the seed, the last secret circuit 156 is configured to verify that the validity date and/or time has not passed. In arrangements in which the attributes include the microcode, the microcode is configured to execute each time the seed is read into the volatile memory 146 of the computing system 108 and transmit a notification to an administrator of the computing system 108, and/or an administrator or owner of the secure computing system, secure database, and/or secure data protected by the last secret indicating that the seed has been accessed.

At block 256, the seed generation circuit 132 sends the seed to the computing system 108. For example, the seed generation circuit 132 sends the seed to the computing system 108 over a secure connection. At block 260, the cryptographic module 104 destroys the HK, the ID, and the seed. Generating the seed based on both the HK and the ID maintains the integrity of the last secret because an HK or an ID that has been altered or replaced by a malicious party cannot be recombined into the seed. Furthermore, the cryptographic module 104 the pseudo random function (PRF) that is used to derive or recover the last secret is not stored (e.g., written) to the non-volatile memory 120 of the cryptographic module 104 (e.g., the cryptographic module 104 excludes the PRF). Therefore, the cryptographic module 104 cannot execute or run the PRF. The non-volatile memory 120 of the cryptographic module 104 excludes the cryptogram MK(HK), the ID, and the seed. Therefore, even if an unauthorized party gains access to the cryptographic module 104, the unauthorized party cannot derive or recover the last secret because the cryptogram MK(HK), the ID, and the seed are not saved to the non-volatile memory 120 and the PRF used to derive or recover the last secret is not stored to the non-volatile memory 120.

The computing system 108 receives the seed from the cryptographic module 104 as CMS EnvelopedData. The last secret circuit 156 of the computing system 108 decrypts the envelope and reads the seed into the memory. In arrangements in which the CMS envelope includes attributes, the last secret circuit 156 verifies the attributes. In arrangements in which the attribute includes a location, the last secret circuit 156 verifies that the location of the computing system 108 matches the location attribute. In arrangements in which the attribute includes a validity period, the last secret circuit 156 verifies that the validity period has not expired. In arrangements in which the attribute includes a microcode, the microcode executes in response to the last secret circuit 156 decrypting the CMS envelope. In arrangements in which the seed is digitally signed, the last secret circuit 156 verifies the signature of the seed using the signing key of the cryptographic module 104.

At block 264, the last secret circuit 156 inputs the seed into the PRF function generator to derive or recover the last secret. At block 268, when the last secret has been derived for the first time (e.g., the last secret is a new last secret that has not been used before), the last secret circuit 156 encrypts one or more of an encryption key, a biometric, one or more pieces of encrypted data, a password used to generate a key, a password used to access data and/or a secure computing device, and any other information intended to be stored securely as cryptographic material. The last secret circuit 156 then destroys the last secret. The non-volatile memory 144 excludes the last secret and the seed.

At block 272, when the last secret is a previously-used last secret that the last secret circuit 156 has recovered, the last secret circuit 156 accesses one or more of an encryption key, a biometric, one or more pieces of encrypted data, a password used to generate a key, a password used to access the secure entity 102, and other cryptographic material using the last secret. The last secret circuit 156 then destroys the last secret. The last secret circuit 156 never writes the first key, the last secret, the ID, the seed, or the cryptogram MK(HK) to the non-volatile memory 144, cache memory, or any other non-volatile media.

Figure 3:
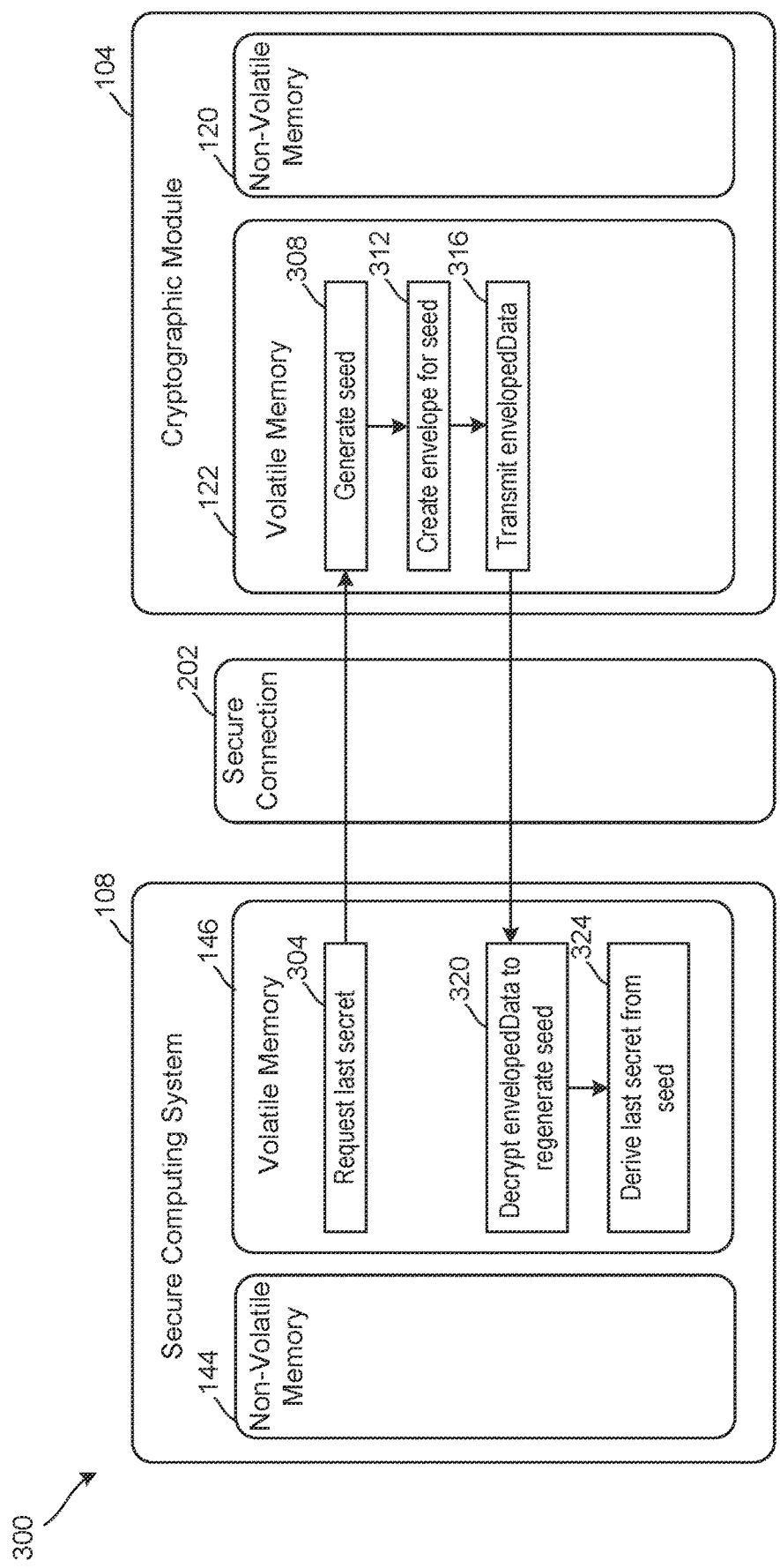
FIG. 3 is a flow diagram showing a process of generating the last secret using the seed while maintaining confidentiality, integrity, and authenticity of the last secret, according to another arrangement.

Referring now to FIG. 3 a flow diagram of a simplified method 300 for initiating a cryptographic process is shown, according to an example arrangement. The method 300 maintains confidentiality, integrity, and authenticity of initialization information for the cryptographic process. Referring to FIGS. 1 and 3, blocks 304-324 describe a process (executed by the cryptographic module 104 and the computing system 108) for deriving a last secret and/or recovering a previously derived last secret and using the recovered last secret. At block 304, the computing system 108 requests a seed configured for deriving or recovering the last secret from the cryptographic module 104 over a secure connection 302. In the illustrated arrangement, the secure connection 302 is a TLS connection. The computing system 108 is on a separate network node than the cryptographic module 104. The last secret provides access to the secure entity 102. The last secret is the last cryptographic element that controls access to the secure entity 102. At block 308, the cryptographic module 104 generates a seed configured for deriving or recovering the last secret. For example, the cryptographic module 104 generates the seed with the seed generation circuit 132. In some arrangements, the seed is a HMAC seed that is generated according to a database encryption key mechanism. In some arrangements, the cryptographic module 104 signs the seed using a signing key of the cryptographic module 104 to create a signature for the seed to generate a signed seed.

At block 312, the cryptographic module 104 creates an envelope for the seed. For example, the cryptographic module 104 generates the envelope for the seed with the seed generation circuit 132. The envelope maintains confidentiality of the seed. In some arrangements, the envelope is a CMS envelope. In some arrangements, the cryptographic module 104 generates one or more attributes for the seed and adds the one or more attributes to the envelope. For example, the one or more attributes can include a location attribute, a validity period of the seed, a security assertion markup language (SAML) assertion, and a microcode. The location attribute includes one or more of a geographic location, a recipient, a data center, a server identifier, an application database, a software instance, and a firmware version to which the seed can be sent or in which the seed can be used. The microcode is configured to execute each time the computing system recovers the seed and transmit a notification indicating that the seed has been accessed to an administrator of the computing system, and/or an administrator or owner of the secure entity 102. At block 316, the cryptographic module 104 transmits the seed to the computing system 108 as EnvelopedData over the secure connection 302. In some arrangements, the EnvelopedData is CMS EnvelopedData.

At block 320, the computing system 108 decrypts the EnvelopedData to regenerate the seed. For example, the computing system 108 decrypts the EnvelopedData using the last secret circuit 156. In arrangements in which the envelope includes one more attributes, the computing system 108 verifies the one or more attributes before decrypting the envelope. In arrangements in which the seed is signed, the computing system 108 verifies the digital signature of the seed. Verifying the digital signature of the seed determines integrity and authenticity of the last secret. At block 324, the computing system 108 derives or recovers the last secret based on the seed. For example, the computing system 108 derives or recovers the last secret with the last secret circuit 156. The last secret is a password, an encryption key, or a tokenized value that is used to access a cryptographic element controlling access to the secure entity 102. In some arrangements, the last secret circuit 156 derives or recovers the last secret by inputting the seed into a PRF. In some arrangements, the PRF includes a SHA-256 algorithm or another hash algorithm. The cryptographic module 104 excludes the last secret and the PRF and the last secret. For example, neither the non-volatile memory 120 nor the volatile memory 122 of the cryptographic module 104 includes the PRF. Therefore, the cryptographic module 104 cannot regenerate the last secret. The computing system 108 cannot generate the seed.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be configured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method blocks, it is understood that the order of these blocks may differ from what is depicted. For example, two or more blocks may be performed concurrently or with partial concurrence. Also, some method blocks that are performed as discrete blocks may be combined, blocks being performed as a combined block may be separated into discrete blocks, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching blocks, correlation blocks, comparison blocks and decision blocks.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for securely sharing and authenticating a last secret, the method comprising:
   generating, by a cryptographic module on a first network node, a seed and an envelope around the seed, the seed configured for deriving or recovering a last secret being a last cryptographic element controlling access to a secure entity; and
   transmitting, by the cryptographic module, the seed to a computing system on a second node different than the first node, the computing system being configured to decrypt the envelope of the enveloped seed to recover the seed, and obtain the last secret based on the seed,
   wherein the cryptographic module is prevented from deriving the last secret.

2. The method of claim 1, further comprising:
   requesting, by the computing system, the seed; and
   receiving, by the computing system, the enveloped seed.

3. The method of claim 1, further comprising:
   reading, by the computing system, one or more attributes from the envelope,
   wherein the one or more attributes comprise at least one of a location attribute, a validity period of the seed, a security assertion markup language (SAML) assertion, and a microcode.

4. The method of claim 3, further comprising:
   verifying, by the computing system, the one or more attributes before decrypting the envelope.

5. The method of claim 3, further comprising:
   executing, by the computing system, the microcode each time the computing system recovers the seed; and
   transmitting, by the computing system to at least one of an administrator of the computing system and an administrator or owner of the secure entity protected by the last secret, a notification indicating that the seed has been accessed.

6. The method of claim 1, further comprising:
   signing, by the cryptographic module, the seed using a signing key of the cryptographic module to create a signature for the seed to generate a signed seed; and
   verifying, by the computing system, the signature of the signed seed,
   wherein the envelope maintains confidentiality of the signed seed, and the signature determines integrity and authenticity of the signed seed.

7. The method of claim 1, wherein the seed comprises a hashed method authentication code (HMAC) seed derived using an HMAC according to a cryptographic message syntax (CMS) method.

8. The method of claim 1, wherein the last secret comprises at least one of a password, an encryption key, a tokenized value, and other cryptographic material.

9. The method of claim 1, further comprising:
   deriving, by the computing system, the last secret based on the seed by a pseudo random function (PRF).

10. A system for securely sharing and authenticating a last secret, the system comprising:
    a cryptographic module on a first network node, the cryptographic module comprising a first processor and a first memory, the first processor comprising:
    a seed generation circuit configured to:
    generate a seed and an envelope around the seed, the seed configured to obtain a last secret being a last cryptographic element controlling access to a secure entity; and
    transmit the enveloped seed to a computing system on a second node different than the first node, the computing system being configured to decrypt the envelope of the enveloped seed to recover the seed, and obtain the last secret based on the seed,
    wherein the cryptographic module is prevented from deriving the last secret.

11. The system of claim 10, the computing system comprising a second processor and a second memory, the second processor comprising:
    a last secret circuit configured to:
    request the seed; and
    receive the enveloped seed.

12. The system of claim 10, wherein the last secret is further configured to read one or more attributes from the envelope, the one or more attributes comprising at least one of a location attribute, a validity period of the seed, a security assertion markup language (SAML) assertion, and a microcode.

13. The system of claim 12, wherein the last secret circuit is configured to verify the one or more attributes before decrypting the envelope.

14. The system of claim 12, wherein the microcode is configured to execute each time the computing system recovers the seed and transmit a notification indicating that the seed has been accessed to an administrator of the computing system, and/or an administrator or owner of the secure entity protected by the last secret.

15. The system of claim 10, wherein the cryptographic module is further configured to sign the seed using a signing key of the cryptographic module to create a signature for the seed to generate a signed seed, and
    wherein the computing system is further configured to verify the signature of the signed seed, and
    wherein the envelope maintains confidentiality of the signed seed, and the signature is to determine integrity and authenticity of the signed seed.

16. The system of claim 10, wherein the seed comprises a hashed method authentication code (HMAC) seed derived using an HMAC according to a cryptographic message syntax (CMS) method.

17. The system of claim 10, wherein the last secret comprises at least one of a password, an encryption key, a tokenized value, and other cryptographic material.

18. The system of claim 10, wherein the computing system is configured to derive the last secret based on the seed by a pseudo random function (PRF).

19. A non-transitory computer readable medium including one or more instructions stored thereon and executable by a processor to:
  generate, by the processor on a first network node, a seed and an envelope around the seed, the seed configured to obtain a last secret being a last cryptographic element controlling access to a secure entity; and
  transmit, by the processor, the enveloped seed to a computing system on a second node different than the first node, the computing system being configured to decrypt the envelope of the enveloped seed to recover the seed, and obtain the last secret based on the seed,
  wherein the cryptographic module is prevented from deriving the last secret.

20. The non-transitory computer readable medium of claim 19, wherein the computer readable medium further includes one or more instructions executable by the processor to:
  signing, by the cryptographic module, the seed using a signing key of the cryptographic module to create a signature for the seed to generate a signed seed.

\* \* \* \* \*